(12) United States Patent
Timms (10) Patent No.: US 11,104,270 B1
(45) Date of Patent: Aug. 31, 2021

(54) WARNING LIGHT SYSTEM FOR TRUCK SAFETY

(71) Applicant: Rodney Timms, Mustang, OK (US)

(72) Inventor: Rodney Timms, Mustang, OK (US)

( * ) Notice: Subject to any disclaimer, the term of this patent is extended or adjusted under 35 U.S.C. 154(b) by 0 days.

(21) Appl. No.: 16/433,613

(22) Filed: Jun. 6, 2019

Related U.S. Application Data (60) Provisional application No. 62/791,236, filed on Jan. 11, 2019, provisional application No. 62/790,348, filed on Jan. 9, 2019, provisional application No. 62/681,424, filed on Jun. 6, 2018.

(51) Int. Cl.
*B60Q 1/54* (2006.01)
*B60Q 1/46* (2006.01)
*B60Q 1/30* (2006.01)

(52) U.S. Cl.
CPC .............. *B60Q 1/54* (2013.01); *B60Q 1/46* (2013.01); *B60Q 1/305* (2013.01)

(58) Field of Classification Search
CPC . B60Q 1/54; B60Q 1/46; B60Q 1/305; B60Q 1/52; B60W 40/13; B60W 40/105; B60W 2520/10
USPC ....... 340/466, 468, 471, 472, 473, 478, 463, 340/467, 470, 431
See application file for complete search history.

(56) References Cited

U.S. PATENT DOCUMENTS

| | | | |
|---|---|---|---|
| 3,364,384 A | 1/1968 | Dankert et al. | |
| 5,604,480 A * | 2/1997 | Lamparter | B60Q 1/50 340/433 |
| 6,020,814 A * | 2/2000 | Robert | B60Q 1/444 307/10.8 |
| 6,133,851 A * | 10/2000 | Johnson | B60Q 1/30 340/901 |
| 6,411,204 B1* | 6/2002 | Bloomfield | B60Q 1/302 340/464 |
| 6,681,877 B2* | 1/2004 | Ono | B60K 31/04 123/351 |
| 6,970,074 B2* | 11/2005 | Perlman | B60Q 1/26 340/425.5 |
| 7,002,458 B2* | 2/2006 | Su | B60Q 1/2665 340/463 |

(Continued)

OTHER PUBLICATIONS

Tsantila, Spiros, "BMW Dynamic Brake Light to Protect Motorcyclists from Rear-End Collisions," [online], Jul. 6, 2015, available at: < https://newatlas.com/bmw-motorcyle-dynamic-brake-light/38331/ > (Year: 2015).

(Continued)

*Primary Examiner* — Anh V La
(74) *Attorney, Agent, or Firm* — Dunlap Codding. P.C.

(57) ABSTRACT

A signal light system including a measuring device, control unit, signal light, and flasher module. The measuring device determines the velocity of a vehicle and generates a first signal indicative of the velocity of the vehicle. The control unit receives, the first signal, processes the first signal from the velocity measuring device and generates a second signal when the velocity of the vehicle is below the threshold velocity. The flasher module receives the second signal from the control unit and enables the signal light to provide a warning. The signal light remains activated to provide the warning while the vehicle travels at any velocity below the threshold velocity.

23 Claims, 7 Drawing Sheets

(56) References Cited

U.S. PATENT DOCUMENTS

| | | | |
|---|---|---|---|
| 7,095,318 B1* | 8/2006 | Bekhor | B60Q 1/26 |
| | | | 340/485 |
| 7,893,823 B2 | 2/2011 | Morales | |
| 8,005,602 B2* | 8/2011 | Bando | B60T 7/22 |
| | | | 340/466 |
| 8,390,475 B2* | 3/2013 | Feroldi | G06F 3/147 |
| | | | 340/901 |
| 8,599,002 B2 | 12/2013 | Sekol | |
| 8,653,957 B2* | 2/2014 | Ehrlich | B60Q 1/305 |
| | | | 307/10.8 |
| 2002/0133282 A1 | 9/2002 | Ryan et al. | |
| 2014/0375448 A1 | 12/2014 | Lee | |
| 2017/0190286 A1* | 7/2017 | Yavitz | B60Q 1/54 |
| 2017/0334336 A1* | 11/2017 | Dellock | B60Q 1/525 |
| 2018/0201182 A1* | 7/2018 | Zhu | B60Q 1/46 |
| 2019/0176687 A1* | 6/2019 | Nagata | B60W 40/105 |

OTHER PUBLICATIONS

"Dynamic Brake Light" [online], Oct. 31, 2017, available at: < https://www.bmw-motorrad.co.za/en/engineering/detail/safety/dynamicbrakelight.html >.

* cited by examiner

WARNING LIGHT SYSTEM FOR TRUCK SAFETY

INCORPORATION BY REFERENCE

The present patent application hereby incorporates by reference the entire provisional patent applications identified by U.S. Ser. No. 62/681,424, which was filed on Jun. 6, 2018, Ser. No. 62/790,348, which was filed on Jan. 9, 2019, and Ser. No. 62/791,236, which was filed on Jan. 11, 2019.

BACKGROUND

The inventive concepts disclosed herein relate generally to motorist safety systems, and more specifically, but not by way of limitation, to systems for enhancing the safety of semi-truck drivers and following motorists. Signal lights on truck trailers are provided as a reminder to following motorists of the truck's current and upcoming movements. A common cause of dangerous and sometimes deadly traffic accidents involve a semi-truck and a following motorist unable to detect when the semi-truck is stopped, slowing or traveling at a low speed—particularly when speed is well below the posted speed limit whether a result of the semi-truck driver having applied its brakes or not.

Thus, a need exists for a warning light system that provides a visual indication to following motorists that the vehicle in front is stopped, decelerating, or traveling at a low speed. It is to such a warning light system that the inventive concepts disclosed herein are directed.

BRIEF DESCRIPTION OF THE DRAWINGS

Like reference numerals in the figures represent and refer to the same or similar element or function. Embodiments of the present disclosure may be better understood when consideration is given to the following detailed description thereof. Such description makes reference to the annexed pictorial illustrations, schematics, graphs, drawings, and appendices. In the drawings.

DETAILED DESCRIPTION OF EXEMPLARY EMBODIMENTS

Before explaining at least one embodiment of the present disclosure in detail, it is to be understood that embodiments of the present disclosure are not limited in their application to the details of construction and the arrangement of the components or steps or methodologies set forth in the following description or illustrated in the drawings. The inventive concepts in the present disclosure are capable of other embodiments or of being practiced or carried out in various ways. Also, it is to be understood that the phraseology and terminology employed herein is for the purpose of description and should not be regarded as limiting.

In this detailed description of embodiments of the inventive concepts, numerous specific details are set forth in order to provide a more thorough understanding of the inventive concepts. However, it will be apparent to one of ordinary skill in the art that the inventive concepts disclosed and claimed herein may be practiced without these specific details. In other instances, well-known features have not been described in detail to avoid unnecessarily complicating the instant disclosure.

As used herein, language such as "including," "comprising," "having," "containing," or "involving," and variations thereof, is intended to be broad and encompass the subject matter listed thereafter, equivalents, and additional subject matter not recited or inherently present therein.

Unless expressly stated to the contrary, "or" refers to an inclusive or and not to an exclusive or. For example, a condition A or B is satisfied by anyone of the following: A is true (or present) and B is false (or not present), A is false (or not present) and B is true (or present), and both A and B are true (or present).

In addition, use of the "a" or "an" are employed to describe elements and components of the embodiments herein. This is done merely for convenience and to give a general sense of the inventive concepts. This description should be read to include one or at least one and the singular also includes the plural unless it is obvious that it is meant otherwise.

Throughout this disclosure and the claims, the terms "about," "approximately," and "substantially" are intended to signify that the item being qualified is not limited to the exact value specified, but includes slight variations or deviations therefrom, caused by measuring error, manufacturing tolerances, stress exerted on various parts, wear and tear, or combinations thereof, for example.

The use of the term "at least one" will be understood to include one and any quantity more than one, including but not limited to each of, 2, 3, 4, 5, 10, 15, 20, 30, 40, 50, 100, and all integers therebetween. The term "at least one" may extend up to 100 or 1000 or more, depending on the term to which it is attached; in addition, the quantities of 100/1000 are not to be considered limiting, as higher limits may also produce satisfactory results. Singular terms shall include pluralities and plural terms shall include the singular unless indicated otherwise.

The term "or combinations thereof" as used herein refers to all permutations and/or combinations of the listed items preceding the term. For example, "A, B, C, or combinations thereof" is intended to include at least one of: A, B, C, AB, AC, BC, or ABC, and if order is important in a particular context, also BA, CA, CB, CBA, BCA, ACB, BAC, or CAB. Continuing with this example, expressly included are combinations that contain repeats of one or more item or term, such as BB, AAA, AAB, BBC, AAABCCCC, CBBAAA, CABABB, and so forth. The skilled artisan will understand that typically there is no limit on the number of items or terms in any combination, unless otherwise apparent from the context.

In accordance with the present disclosure, certain components of the signal light system include circuitry. Circuitry, as used herein, could be analog and/or digital components, or one or more suitably programmed microprocessors and associated hardware and software, or hardwired logic. Also, certain portions of the implementations may be described as "components" that perform one or more functions. The term "component," may include hardware, such as a processor, an application specific integrated circuit (ASIC), or a field programmable gate array (FPGA), or a combination of hardware and software. Software includes one or more computer executable instructions that when executed by one or more component cause the component to perform a specified function. It should be understood that the algorithms described herein are stored on one or more non-transitory memory. Exemplary non-transitory memory includes random access memory, read only memory, flash memory or the like. Such non-transitory memory can be electrically based or optically based.

Finally, as used herein any reference to "one embodiment" or "an embodiment" means that a particular element, feature, structure, or characteristic described in the embodiment is included in at least one embodiment. The appearances of the phrase "in one embodiment" in various places in the specification are not necessarily referring to the same embodiment, although the inventive concepts disclosed herein are intended to encompass all combinations and permutations including one or more features of the embodiments described.

Figure 1:
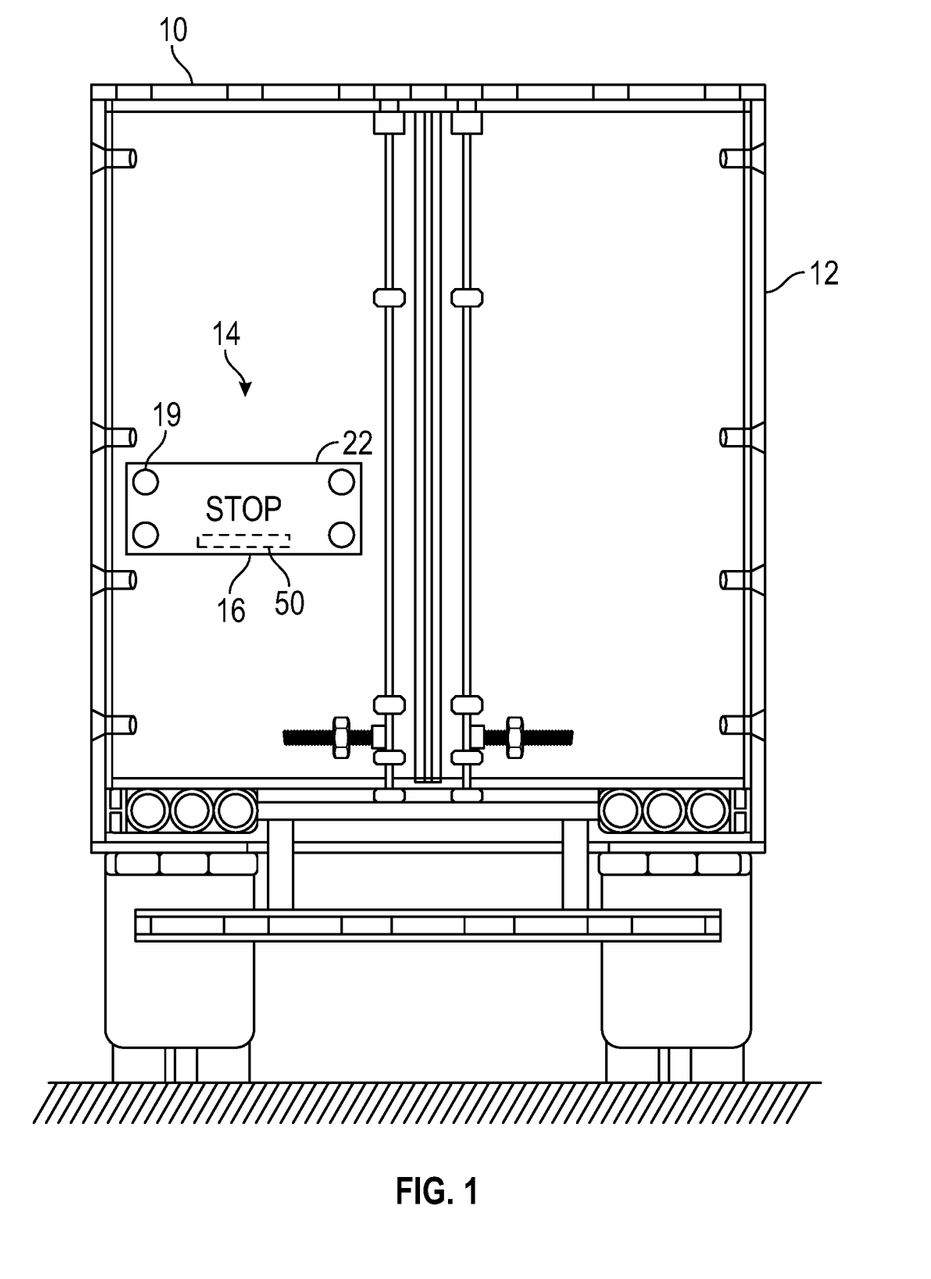
FIG. 1 is a rear elevational view of a truck with a warning light system according to one embodiment of the inventive concepts disclosed herein.

Referring now to FIG. 1, a rear end of a vehicle, such as a truck 10 and its trailer 12 are illustrated with a warning light system 14 constructed in accordance with the inventive concepts disclosed herein. The warning light system 14 may include a plurality of lights 15, e.g. LEDs, arranged to form a message, such as a stop warning light 16 and a slow warning light (not shown). An example of the warning light system 14 is shown by way of example in FIGS. 8-13. In the example shown, particular ones of the lights 15 can be illuminated and not illuminated to display the message. Only a few of the lights 15 are labeled in FIG. 8 for purposes of brevity.

The warning light system 14 may also be provided with multiple signal lights 19. The signal lights 19 may provide a variety of functions or may be constructed in a variety of structures to alert a following motorist that the truck 10 is stopped, decelerating, traveling at a velocity below the speed limit, or turning, for instance. Such functions may include, but are not limited to, the illumination of particular colors or flashing patterns. Such constructions may include, but are not limited to, particular shapes, messages (e.g., stop, slow), or particular positioning on the trailer. The warning light system 14 may be constructed to fit in a housing 22. The lights 15 may be located on an outside of the housing 22, or be positioned within the housing 22, and visible through a plurality of openings formed in the housing 22.

The warning light system 14 is shown to be mounted on one side of the rear end of the trailer 12. It will be appreciated that the warning light system 14 may be positioned in any suitable location, such as near or on a bumper of the trailer 12, for instance. The warning light system 14 may also be provided with a housing 22 supporting the lights forming the message.

Figure 2:
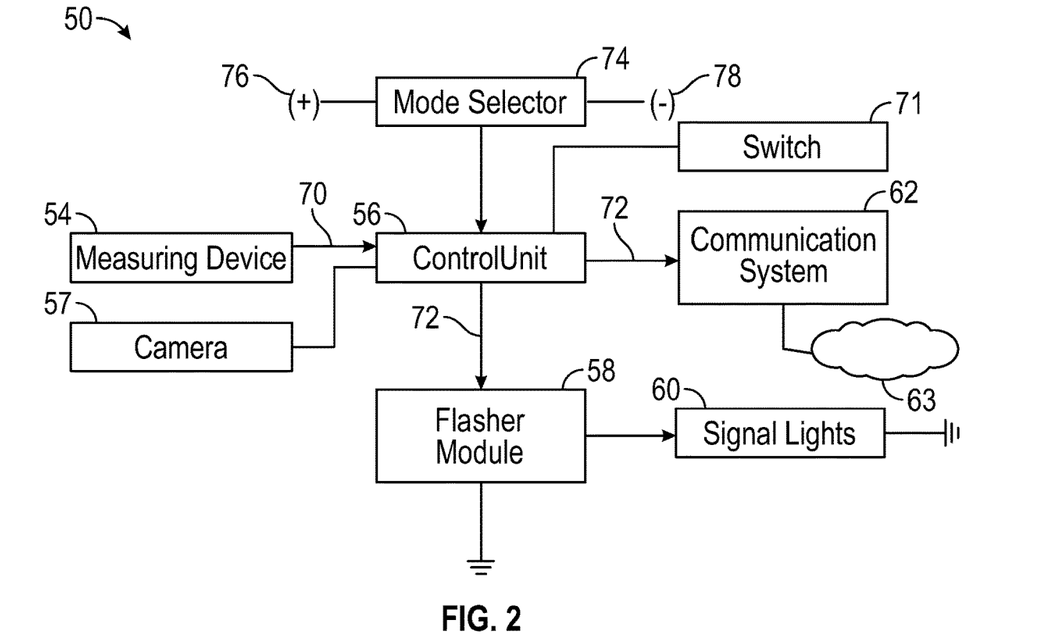
FIG. 2 is a general schematic diagram of a signal light system according to one embodiment of the present disclosure, the signal light system including a measuring device for determining the velocity of a vehicle.

Referring now to FIG. 2, shown therein is a general schematic diagram of a signal light system 50 according to the present disclosure. The signal light system 50 may be used with a wide variety of motor vehicles (such as truck 12 shown in FIG. 1). Applicable motor vehicles may include, but are not limited to including, automobiles, recreation vehicles, cars, motorcycles, and commercial trucks. The system 50 includes a measuring device 54, a control unit 56, a camera 57, a flasher module 58, one or more signal lights 60, and a communication system 62 which may be connected to memory 63. The measuring device 54 may be any known device in the art for determining velocity and may be, but is not limited to being, a speedometer, an accelerometer, a global position system (GPS), a hubodometer, a radar, or an anti-lock braking system (ABS). The measuring device 54 communicates with the control unit 56 using wired or wireless communication. The control unit 56 communicates with the flasher module 58, and the communication system 62 using wired or wireless communication. The flasher module 58 communicates with the one or more signal lights 60 using wired or wireless communication. Exemplary wireless communication protocols that can be used to communicate between the components of the signal light system include bluetooth and wi-fi. In some cases, the system 50 may also monitor braking to provide additional information that can be used to trigger a warning to following drivers. For example, the system 50 may include a pressure sensor within a hydraulic braking system (e.g., detecting pressure above a threshold such as 30 psi that is indicative of hard braking).

The measuring device 54 determines the velocity of the vehicle and generates a first signal 70 indicative of the velocity being below a threshold velocity. The threshold velocity may be, but is not limited to being a rate below a posted speed limit. By way of example only, the threshold velocity may be 30 mph below the posted speed limit on most highways, where semi-trucks frequent. The speed limit on interstates in the United States is commonly set at 60-75 mph. The threshold velocity may therefore be between 25-45 mph, for example. The threshold velocity may be predetermined, or dynamically determined, as discussed above. The threshold velocity, for example, may be set at 5 mph increments. Thus, in one embodiment, candidate threshold velocities may be 25 mph, 30 mph, 35 mph, 40 mph, and 45 mph. The threshold velocity may be set and adjusted using predetermined sets of pins or switches within the control unit. In some embodiments, the control unit 56 may have a switch 71 or other selection mechanism to permit the driver to adjust the threshold velocity by selecting one of the candidate threshold velocities. In other embodiments, the control unit 56 may be configured to avoid adjustment of the threshold velocity by the driver. In these embodiments, the mechanism used to adjust the threshold velocity may be unavailable to the driver.

The control unit 56 and its corresponding circuitry receives and processes the first signal 70. The control unit 56 generates a second signal 72 and passes the second signal 72 to the flasher module 58 and the communication system 62. The flasher module 58 receives the second signal 72 from the control unit 56 and enables the signal light 60 to illuminate. The flasher module 58 may be a switch circuit, such as a transistor based switch circuit, relay, or the like.

The communication system 62 receives the second signal 72 from the control unit 56 and broadcasts a wireless communication signal to other vehicles that are within close proximity to the communication system 62. In some embodiments, the wireless communication signal is received by a receiver (not shown) within another vehicle and interpreted to provide a warning to the driver of the other vehicle, and/or used as an input to an autonomous driving system to avoid a potential wreck. The communication system 62 may conform to a set of protocols known in the art as Vehicle to Vehicle (V2V) communication. V2V communication enables vehicles to wirelessly exchange information about their speed, location, and heading. The technology behind V2V communication allows vehicles to broadcast and receive omni-directional messages (up to 10 times per second), creating a 360-degree "awareness" of other vehicles in proximity. Vehicles equipped with appropriate hardware and/or software (or safety applications) can use the messages from surrounding vehicles to determine potential crash threats as the crash threats develop. The technology can then employ visual, tactile, and audible alerts—or, a combination of these alerts—to warn drivers.

The signal light 60 may remain illuminated so long as the vehicle travels at a velocity below the threshold velocity. In other words, the signal light 60 may remain illuminated irrespective of braking, or an acceleration or deceleration by the vehicle if the vehicle is traveling at a velocity below the threshold velocity. In this way, a driver of the vehicle is able to alert following motorists of the vehicle's reduced speed even if the velocity of the vehicle is at a substantially constant rate.

As shown in FIG. 2, the signal light system 50 may include a mode selector 74. The mode selector 74 may have an on-mode 76 for enabling the control unit 56 to generate the second signal 72, and off-mode 78 for disabling the control unit 56 from generating the second signal 72. The mode selector 74 may operate in a variety of ways known in the art including, but not limited to, manual operation or automation. The automation, for example, may permit the driver to select the off-mode, and after a predetermined time period of 2-3 minutes, for example, the control unit 56 automatically switches to the on-mode. The mode selector 74 may receive signals from a global positioning system ("GPS") unit (FIG. 6) that determines a location having a posted speed limit equal to or below the threshold velocity. (Global positioning systems are more generally described below). The GPS unit may enable the mode selector 74 in the off-mode 78 when the GPS determines such a location. For example, when the GPS unit determines the vehicle is driving on a business route through a town with a posted speed limit of 35 mph, the mode selector 74 may automatically switch into the off-mode 78. This way following motorists are not falsely alerted to a slower speed than normal since all motorists would be traveling at a slower speed. The control unit 56 may also be programmed with multiple thresholds thereby permitting appropriate thresholds to be selected and set either manually or automatically by the control unit 56 during different driving conditions. For example, the control unit 56 may be programmed with a highway threshold suitable for use in highway driving, and a town threshold suitable for use during in-town driving. The town threshold would be less than the highway threshold.

The control unit 56 may also be programmed to monitor deceleration of the vehicle by interpreting the first signals 70, and send the second signal 72 to the flasher module 58 and the communication system 62 when the rate of deceleration is above a predetermined threshold to cause signals lights 60 and the communication system 62 to emit the warning signals. Then, the control unit 56 may continue to cause the signal lights 60 and the communication system 62 to emit the warning signals when the speed of the vehicle is below the threshold velocity.

The camera 57 may be a single camera or multiple cameras that cover a predetermined area. For instance, the camera 57 may be a collection of cameras that record data covering 180 degrees when the signal light system 50 is place on the back of a trailer such as trailer 12. The camera 57 may be built into housing 22 (FIG. 1), for instance, or may be mounted separately from the housing 22. For instance, the camera 57 may be mounted on top of the trailer 12 and may offer a 360 degree view around the truck 10 and trailer 12.

The communication system 62 may also record or stream data from the camera 57 to memory 63 which may be cloud storage, for instance. The data from the camera 57, may be stored for later retrieval and/or streamed for live viewing, for instance, by a dispatcher. The camera 57 may be set to record constantly, or, the camera 57 may be triggered to record based on predetermined events. For instance, the control unit 56 may be programmed to cause the camera 57 to record when the vehicle drops below a predetermined velocity, or the control unit 56 may be programmed to cause the camera 57 to record when the vehicle accelerates or decelerates suddenly.

In some embodiments, the camera 57 may be triggered to record by a sensor (not shown) such as a proximity sensor. In such an embodiment, the camera 57 may be triggered to record when motion is sensed within a predetermined distance from the signal light system 50. Such motion may be triggered by another vehicle or a person approaching the signal light system 50 (which may be attached to the trailer 12 which contains cargo), for instance. In such instances, the camera 57 may be programmed to record for a predetermined amount of time, or the camera 57 may be programmed to record for as long as motion is detected.

In one embodiment (not shown), the signal light system 50 may be provided with a display which may be placed in a passenger compartment of a vehicle such as the truck 12 of FIG. 1. The display may be connected to the camera 57 such that a driver of the vehicle may use the camera 57 to see what is behind the vehicle when backing up, for instance. In such an embodiment, the camera 57 and the display may be turned on manually using a switch (not shown) or automatically when the measuring device 54 detects that the vehicle is moving in reverse, for instance.

Referring again to FIG. 1, the warning light system 14 may include the signal light system 50 at least partially positioned within the housing 22. The mode selector 74, for example, can also be positioned within the housing 22, or can be remote therefrom. For example, the mode selector 74 may be positioned to be accessible by the driver, such as within the cab of the vehicle. The measuring device 54 and the control unit 56 of the signal light of the signal light system 50 may also be positioned within the housing 22, and may not be programmed with an anticipated route. In this embodiment, the measuring device 54 determines the velocity of the vehicle, and signals indicating such velocity are sent to the control unit 56. As discussed above, the control unit 56 is programmed with at least one threshold velocity. The threshold velocity may be, but is not limited to being a rate below a posted speed limit. By way of example only, the threshold velocity may be 30 mph below the posted speed limit on most highways, where semi-trucks frequent. The speed limit on interstates in the United States is commonly set at 60-75 mph. The threshold velocity may therefore be between 25-45 mph, for example. The threshold velocity may be predetermined, or dynamically determined, as discussed above. The threshold velocity, for example, may be set at 5 mph increments. Thus, in one embodiment, candidate threshold velocities may be 25 mph, 30 mph, 35 mph, 40 mph, and 45 mph. The threshold velocity may be set and adjusted using predetermined sets of pins or switches within the control unit 56. In some embodiments, the control unit 56 may have a switch 71 or other selection mechanism to permit the driver to adjust the threshold velocity by selecting one of the candidate threshold velocities. In other embodiments, the control unit 56 may be configured to avoid adjustment of the threshold velocity by the driver. In these embodiments, the mechanism used to adjust the threshold velocity may be unavailable to the driver. In one embodiment, the control unit 56 may be programmed with a first threshold velocity larger than a second threshold velocity. The control unit 56 is programmed to cause the signal lights 60 to display a first message such as "slow" upon the velocity of the vehicle being between the first threshold velocity and the second threshold velocity; and a second message such as "stop" upon the velocity of the vehicle being below the second threshold velocity. For example, the first threshold velocity can be 25 mph, and the second threshold velocity can be 5 mph. Although, the skilled artisan will understand that the first and second threshold velocities can be selected based upon particular types of driving conditions, such as city driving versus highway driving. In some embodiments, the warning light system 14 including the signal light system 50 at least partially positioned within the housing 22, is an independent unit that is not interconnected with any of the vehicle's warning light systems (brake lights, running lights, etc.) or the vehicle's braking system, or navigation system. In these embodiments, the warning light system 14 may include a power supply, such as a battery or solar power supply. In other embodiments, the warning light system 14 may be connected to the vehicle's power supply, e.g., battery or alternator.

Figure 3:
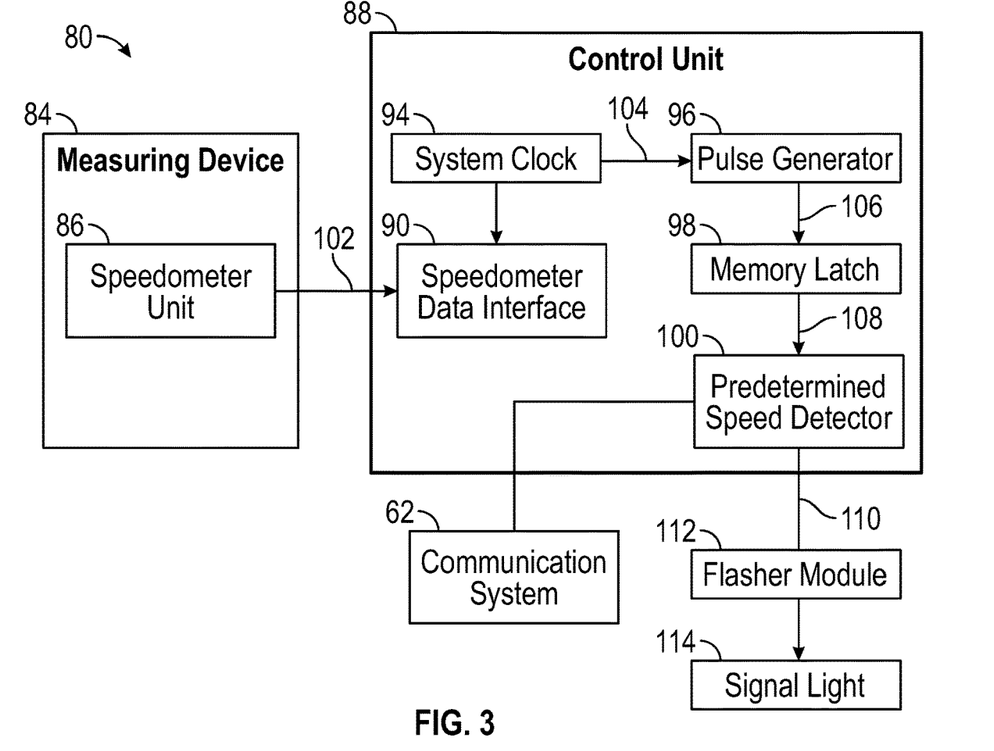
FIG. 3 is a diagram of another embodiment of the signal light system where the measuring device includes a speedometer.

Referring now to FIG. 3, another embodiment of a signal light system 80 is illustrated that is similar in construction and function as the embodiment depicted in FIG. 3, with the exception that the measuring device 84 includes a speedometer unit 86. It should be appreciated that the signal light system 80 incorporating the speedometer unit 86 may include a variety of circuitry and components known in the art. For example, a control unit 88 may include a speedometer data interface 90, a system clock 94, a pulse generator 96, a memory latch 98, and a predetermined speed detector 100. The speedometer unit 86 may connect into the speedometer data interface 90. The speedometer data interface 90 may receive velocity input data 102 from the speedometer unit 86 and process the data 102 by synchronizing the data 102 with the system clock 94.

The system clock 94 may generate synchronizing pulses for system timing, and send input data 104 to the pulse generator 96. The pulse generator 96 may be a Tektronix 73A270, such as an arbitrary pulse/pattern generator module, with two independent programmable output channels, TTL and level-programmable bipolar outputs to ±17.4 V for each channel, time duration values which can be updated "on-the-fly," and is amenable to a variety of software interfaces, such as VXI plug-and-play, WIN, WIN95 and WINNT Frameworks. Ideally, the 73A270 Arbitrary Pulse/ Pattern Generator (APPG) Module provides two completely independent output channels that can be individually programmed to generate arbitrary bipolar or TTL serial data patterns. The pulse generator 96 may generate accurate timing pulses for speed data sampling—e.g., digital square pulses used to calculate the vehicle velocity may provide data input 106 into the current speed memory latch 98. The current speed memory latch 98 may store real time speed sample data 108 during the sample pulse. The real time speed data 108 may be fed into the predetermined speed detector 100. If the predetermine speed detector 100 detects a velocity below the threshold velocity, then it may generate a flasher module control signal 110. A flasher module 112 may receive the control signal 110 and enable a signal light 114 to illuminate.

Figure 4:
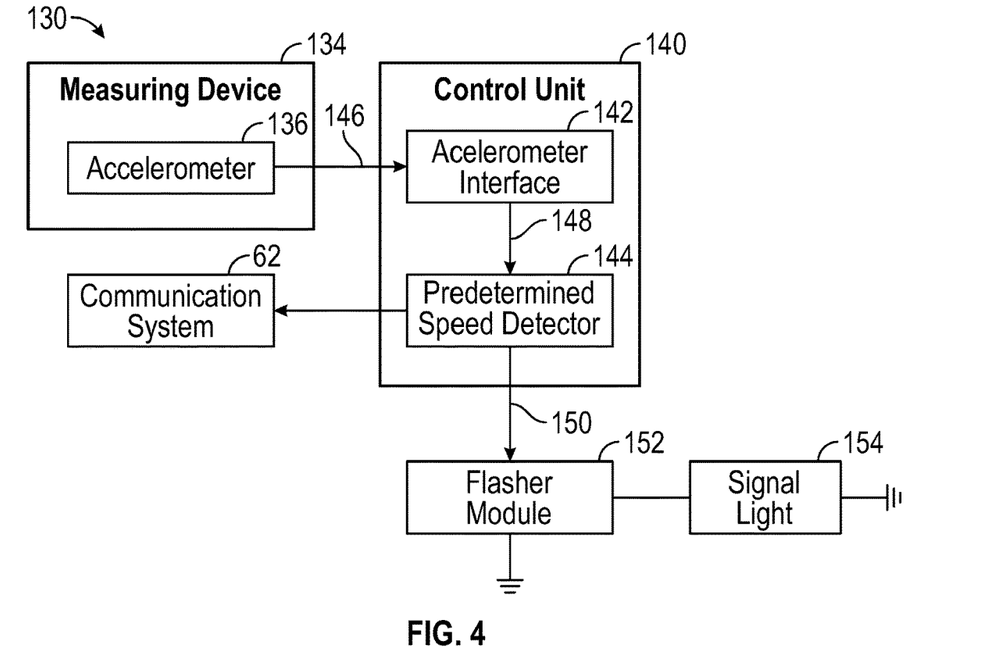
FIG. 4 is a diagram of another embodiment of the signal light system where the measuring device includes an accelerometer.

Referring now to FIG. 4, another embodiment of a signal light system 130 is illustrated that is similar in construction and function as the embodiment depicted in FIG. 3, with the exception that a measuring device 134 is an inertial measurement unit having one or more accelerometer transducer unit 136 and/or gyrometer transducer unit (not shown). The measuring device 134 will be described hereinafter by way of example as the accelerometer transducer unit 136. The accelerometer transducer unit 136 may sense inertial forces of deceleration (negative acceleration through space) and convert the rate of deceleration information into an electronic signal, which may be either digital or analog. The accelerometer transducer unit 136 may be mechanically aligned with the axis of a forward moving vehicle. One having ordinary skill in the art should appreciate that the accelerometer unit 136 may be piezoresistive, or capacitative, optical, vibrating beam, or electromagnetic, most of which are commercially available from companies such as Honeywell, Litton, Entran, and Summit, among others.

A control unit 140 of the embodiment shown in FIG. 4 may include an accelerometer interface 142 and a speed detector 144. The accelerometer transducer unit 136 may pass an electronic signal 146 into the control unit 140, wherein the accelerometer interface 142 may convert the electronic signal 146 into a real time speed data 148—in either digital or analog form for example. The speed detector 144 may use the real time speed data 148 and determine whether to generate flasher module signal code 150—the code 150 being in either digital or analog format. The code 150 may be transmitted to flasher module 152 for enabling signal light 153 to illuminate.

The accelerometer 136 may be any suitable accelerometer known in the art including, but not limited to, an EGE-73, with a built-in {fraction (½)}-bridge of fixed resistors suitable for shunt calibration and compatible with many systems. In some embodiments, the accelerometer 136 may be a piezo-resistive seismic mass type.

Figure 5:
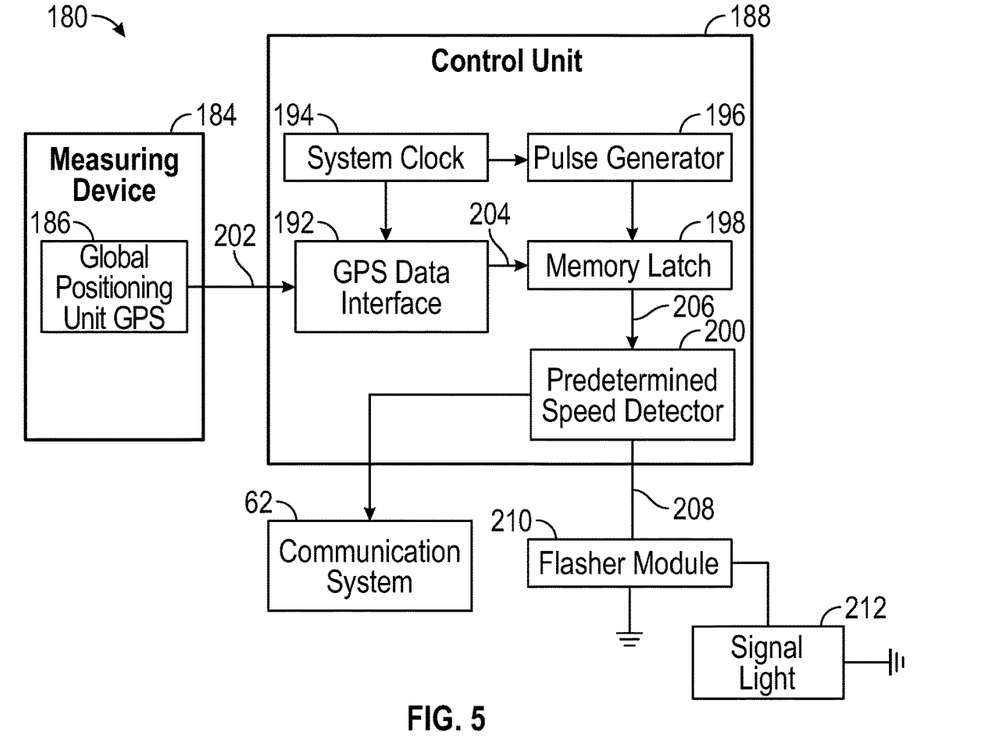
FIG. 5 is a diagram of another embodiment of the signal light system where the measuring device includes a global positioning system (GPS).

Referring now to FIG. 5, a light signal system 180 is illustrated where the measuring device 184 is a global positioning system (GPS) 186. It should be appreciated that this embodiment may include variety of circuitry and components known in the art. For example, a control unit 188 may include a GPS data interface 192, a system clock 194, a pulse generator 196, a memory latch 198, and a predetermined speed detector 200.

One having ordinary skill in the art should also appreciate the broad applicability of various commercially available GPS systems such as those available from Trimbal, Garmin, or Bendix, for example. The global positioning system 186 may receive a plurality of radio signals from satellites and ground transmitters (not shown), and determine real-time geographic position output velocity data 202 (speed over land). In some instances, measuring the distance between a certain target and an observation point using GPS signals may be faster, convenient, and more accurate than conventional approaches. The well-known Naystar GPS includes twenty-four spacecraft in orbits inclined at fifty-five degrees to the Equator.

The inclined orbits may provide worldwide coverage, including the North and South poles. The GPS system 186 may allow a user anywhere on Earth to receive the transmissions of at least four satellites at once. Triangulation mathematical calculations with these satellites may provide an accurate reading of position and velocity in three dimensions. Control stations around the world keep GPS satellites precisely calibrated and their orbits aligned.

Each GPS satellite may contain an atomic clock for transmitting continuous time signal and other information to receivers on Earth. The receiver may acquire and track these signals, decode the data, and then make range and velocity calculations. GPS satellites may be used as radiation sources and GPS receivers may form a passive radar system. GPS signals may have two unique characteristics which are desirable in passive range measuring. First, the signals may be available from four or more different satellites. Second, the GPS continuous time coarse/acquisition (C/A) signal may have a period of 1 millisecond. Thus, it may be possible to measure distance every millisecond. The Naystar system satellites have been launched into medium-altitude earth orbits in six orbital planes, each tipped 55 degrees with respect to the equator, and the complete GPS satellite constellation comprises twenty-one satellites and several spares, for 24, as described above. Signals transmitted from these satellites may allow a receiver, such as GPS unit 186, near the ground to accurately determine time and its own position. Each satellite may transmit data that provides precise knowledge of the satellite position and may allow measurement of the distance from that satellite to the antenna of the GPS unit's 186 receiver. With this information from at least four GPS satellites, the GPS unit 186 may compute its own position, velocity and time parameters through, for example, the navigation solution. Four to seven satellites are observable by the GPS unit 186 anywhere on or near the earth's surface if the GPS unit's 186 receiver has an unobstructed view of the sky, down to very near the horizon. Each satellite transmits signals on two frequencies known as L1 (1575.42 MHz) and L2 (1227.6 MHz), and all satellites share these frequencies using the CDMA DSSS techniques, not described here.

Because of these two characteristics, one may use GPS signals to measure distance at any location, any time, and perform updates frequently. The velocity data 202 obtained in this, or any other fashion using GPS, may be input into the GPS data interface 192. The GPS data interface 192 may take the velocity data 202 from the GPS unit 186 and synchronize the velocity data 202 with the system clock 194. The GPS data interface 192 may send processed data 204, which may be in a digital format, into the current speed memory latch 198.

The current speed memory latch 198 may store real time speed data 206 during the sample pulse. The real time speed data 206 may be fed into the predetermined speed detector 200. If the speed detector 200 detects a velocity below the threshold velocity, then the speed detector 200 may generate a flasher module control signal 208. A flasher module 210 may receive the control signal 208 and enable a signal light 212 to illuminate.

The GPS 186 may be programmed with a street and/or topography database. In this embodiment, the control unit 188 may use the signals from the global position system 186 to predict and turn on the signal lights 212 and/or enable the communication system 62 to emit warning signals. For example, the control unit 188 may monitor the topography in the vehicle's path to determine whether the grade will cause the vehicle to slow down. If so, the control unit 188 may emit signal 208 to the flasher module 210 and the communication system 62 to warn the drivers following the vehicle. In other embodiments, the GPS 186 and/or the control unit 188 may not be programmed with a predetermined route of the vehicle. In this instance, the GPS 186 and/or the control unit 188 monitors the current velocity of the vehicle and may not provide any signals to the flasher module 210 indicative of anticipated velocity changes.

Figure 6:
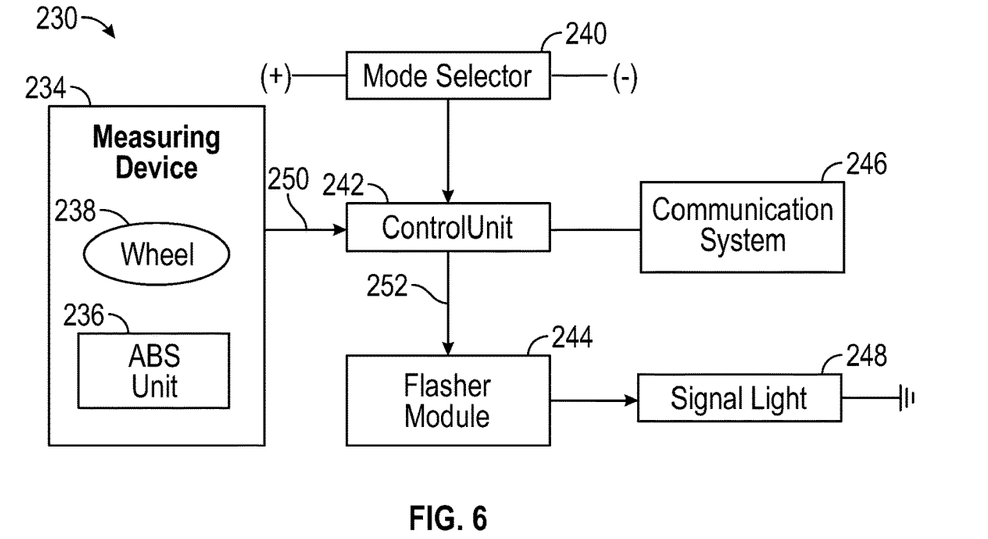
FIG. 6 is a diagram of another embodiment of the signal light system where the measuring device includes an anti-lock braking system (ABS).

Referring now to FIG. 6, an embodiment of a signal light system 230 is illustrated where a measuring device 234 is provided with an anti-lock braking system ("ABS") 236, a wheel sensor 238, a mode selector 240, control unit 242, a flasher module 244, a communication system 246, and a signal light 248. Signal lights 248 may be illuminated from the anti-lock braking ("ABS") system 236. The ABS system 236 may comprise monitoring a rotation of a wheel hub 238. As one having ordinary skill in the art will appreciate, the device may rotate with a wheel (such as wheel hub 238) to provide an electronic signal proportional to a rate of revolution of the wheel. For example, the ABS system 236 may use an electromagnetic inductive technique. An ABS system 236 generally only senses when a wheel locks. However, an ABS system 236 may be modified to detect other information.

As shown in FIG. 6, the ABS system 236 may detect a velocity of the vehicle and generate a first signal 250 indicative of the velocity of the vehicle being below the threshold velocity. The first signal 250 may be received by the control unit 242 where it may be further processed before the control unit 242 sends a second signal 252 to the flasher module 244. The flasher module 244 may enable the signal light 248 to illuminate in response to the second signal 252 received from the control unit 242.

Figure 7:
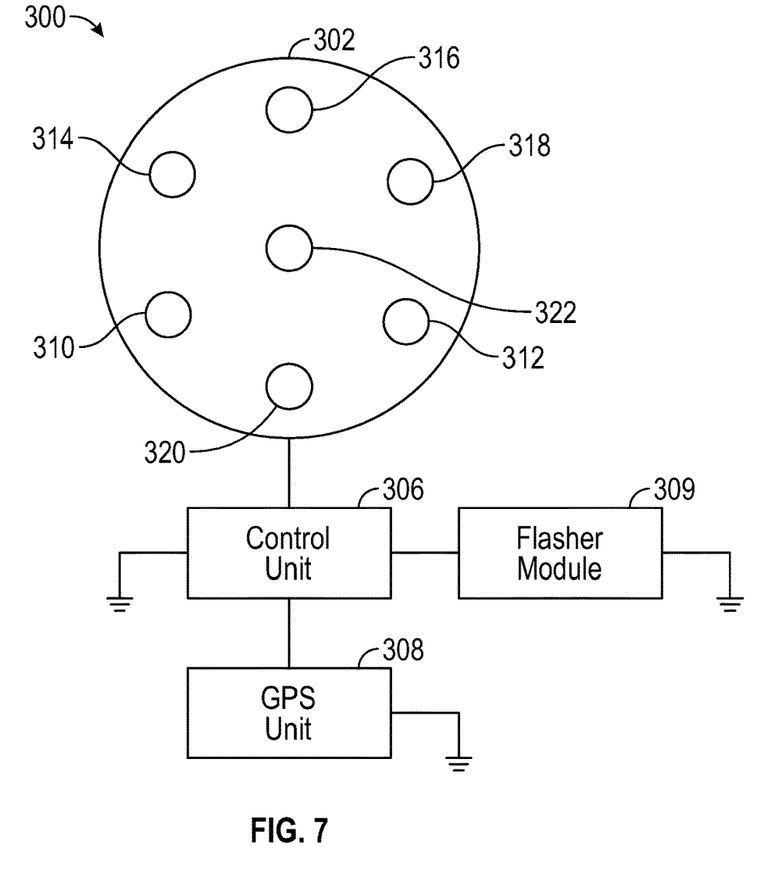
FIG. 7 is a diagrammatic view of a trailer receptacle and GPS unit according to one embodiment of the inventive concepts disclosed herein.

Referring now to FIG. 7, an embodiment of a signal light system 300 is shown having a trailer receptacle 300 (e.g., 7-way trailer receptacle), control unit 306, a GPS unit 308, and a flasher unit 309 constructed in accordance with the present disclosure. Through the functioning of the system 300, the control unit 306 may communicate with the trailer receptacle 300 and receive input from a left turn signal terminal 310 and/or a right signal terminal 312 to determine when the vehicle may be turning. The GPS unit 308 and the control unit 306 may be installed separately from or on the receptacle 300. By using the GPS unit 308 to monitor current velocity, topography or upcoming maneuvers of a truck, tractor, or trailer, the GPS unit 308 may send signals to the control unit 306, which communicates with the receptacle 300 to control various lights in due to current velocity, velocity changes, or anticipation of upcoming maneuvers. For example, when a driver enters the destination into the GPS unit 308, the GPS unit 308 will calculate a route, which generally includes multiple turns and different types of terrains, including slopes. The GPS unit 308 may send signals to the control unit 306, which may send control signals to the receptacle 300 to activate the signal light 212 (shown in FIG. 6) automatically before the velocity of the vehicle is below the threshold velocity. This may occur, for example, when the vehicle approaches an incline, or within a predetermined distance or time prior to a left or right turn in the vehicle route—and therefore alert following motorists. The predetermined distance or time may be selected based upon an expected amount of distance or time to allow the vehicle to slow prior to the left or right turn. The amount of distance or time may depend upon the current velocity of the vehicle, and an expected amount of deceleration. Thus, the system 300 may anticipate a turn and activate the signal lights 212 in accordance with the functions described with respect to FIG. 6.

One having ordinary skill in the art should appreciate that the receptacle 300 may be constructed similar to any suitable 7-way vehicle connector known in the art. Therefore, the construction of the receptacle 300 will not be described in detail. For example, but not by way of limitation, the receptacle 300 may connect to a tractor wiring harness and may be mounted on the back of a cab where a pigtail from a trailer plugs in. As one having ordinary skill in the art should also appreciate, the receptacle 300 may include a battery connector 314, a vehicle ground connector 316, a tail and running light connector 318, a brake controller connector 320, a reverse light connector 322. By way of the circuitry of the system 300, the control unit 306 may communicate with the receptacle 300 to receive information indicative of a potential right turn from the right turn signal via the terminal 312, and/or a potential left turn from the left turn signal via the terminal 310, and send a signal to the flasher module 309 via the tail and running light connector 318 to warn the drivers following the vehicle.

Referring now to FIGS. 1 and 7, the control unit 306 electrically connects the stop warning light 16 to a brake system (not shown) of the truck 10. The control unit 306 is configured to activate the stop warning light 16 with a solid light or flashing light when a driver actuates the brake system by engaging a brake pedal (not shown), a lever (also not shown), or other mechanism of the brake system. When the brake system is deactivated, such as by releasing the brake pedal, the stop warning light 16 is deactivated.

The flasher module 309 electrically connects the stop warning light 16 to a flasher system (i.e., hazards) of the truck 10. The stop warning light 16 is configured to activate the slow warning light so the slow warning light flashes when the flasher module 309 is activated. When the flasher module 309 is deactivated, the slow warning light 18 is deactivated.

Figure 8:
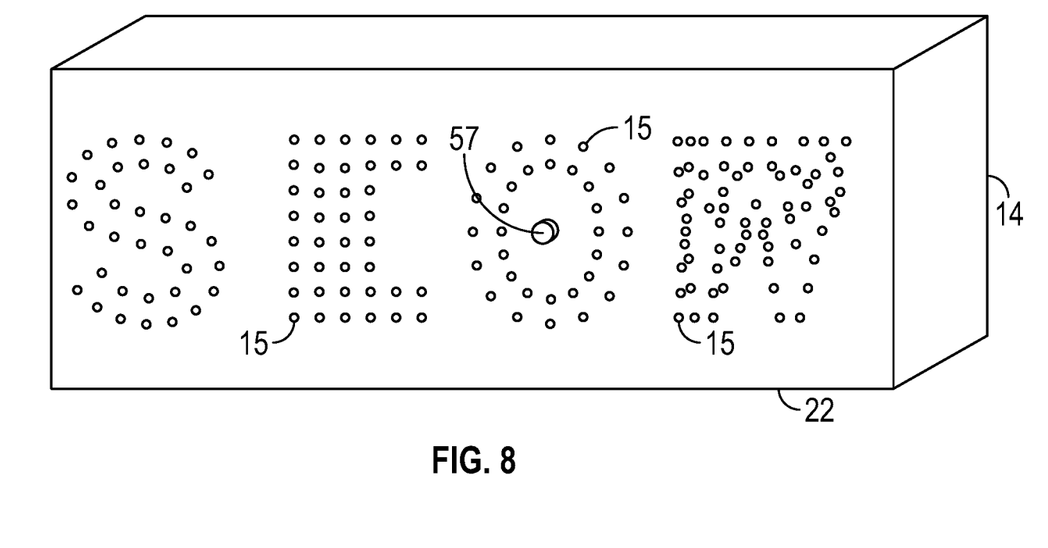
FIG. 8 is a front perspective view of an exemplary warning light system constructed in accordance with the present disclosure
Figure 9:
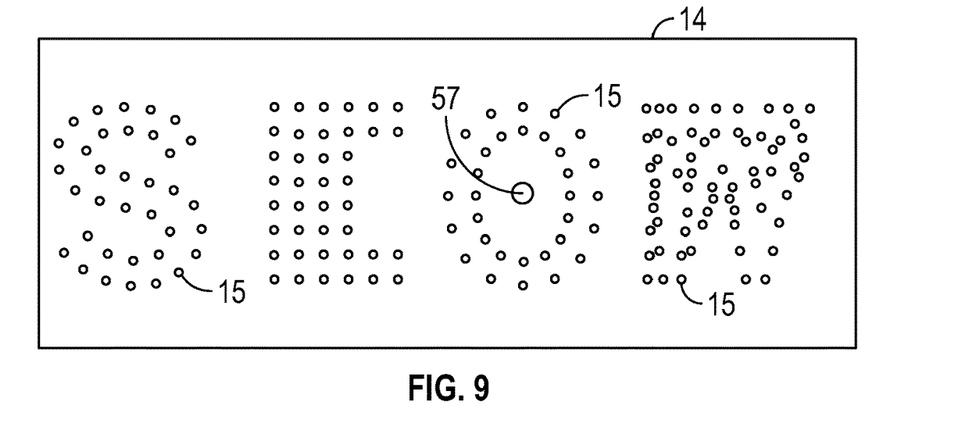
FIG. 9 is a front view of an exemplary warning light system constructed in accordance with the present disclosure.
Figure 10:
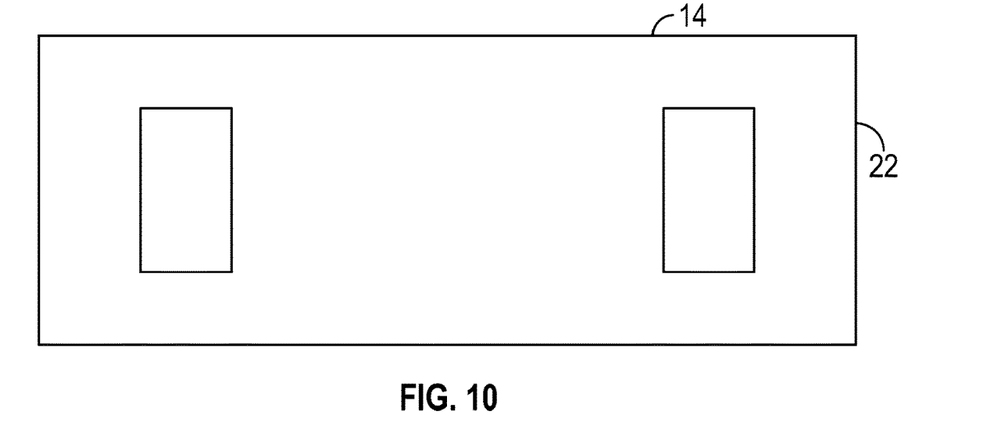
FIG. 10 is a rear view of the warning light system of FIG. 8
Figure 11:
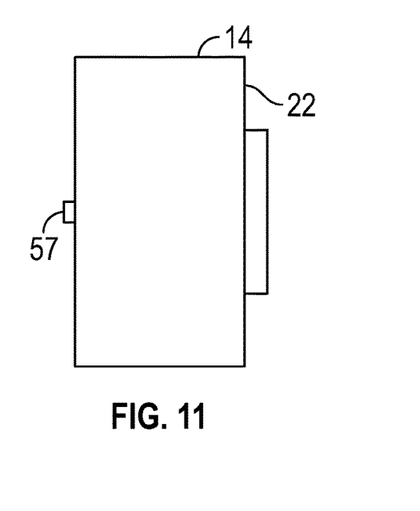
FIG. 11 is a left side view of the warning light system of FIG. 8.
Figure 12:
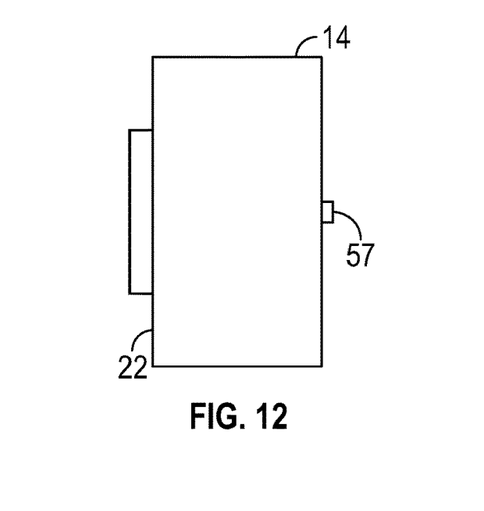
FIG. 12 is a right side view of the warning light system of FIG. 8.
Figure 13:
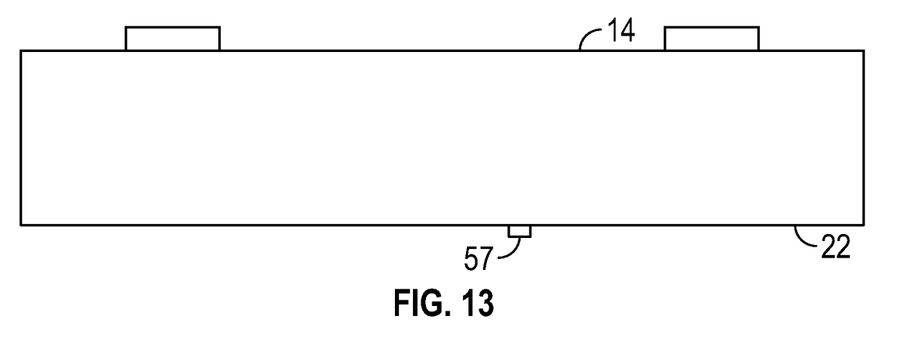
FIG. 13 is a top plan view of the warning light system of FIG. 8.
Figure 14:
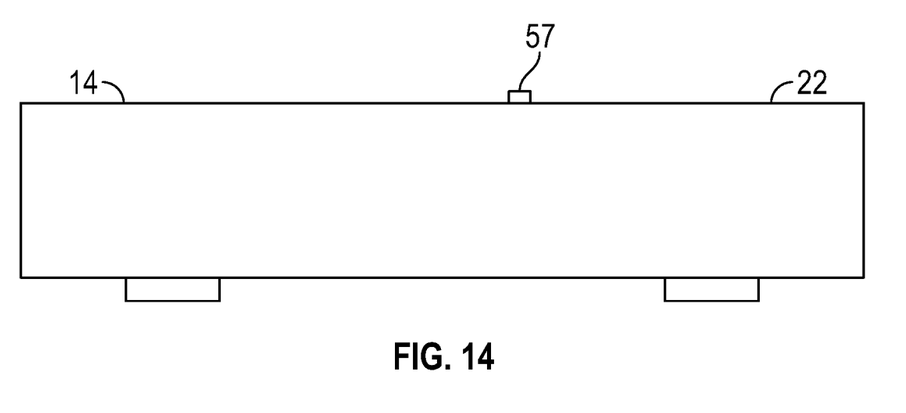
FIG. 14 is a bottom plan view of the warning light system of FIG. 8.

FIG. 8 is a front perspective view of the exemplary warning light system 14 constructed in accordance with the present disclosure. FIG. 9 is a front view of the warning light system 14 of FIG. 8. FIG. 10 is a rear view of the warning light system 14 of FIG. 8. FIG. 11 is a left side view of the warning light system 14 of FIG. 8. FIG. 12 is a right side view of the warning light system 14 of FIG. 8. FIG. 13 is a top plan view of the warning light system 14 of FIG. 8. FIG. 14 is a bottom plan view of the warning light system 14 of FIG. 8.

From the above description, the inventive concepts disclosed are well adapted to carry out the objects and to attain the advantages mentioned and those inherent in the inventive concepts disclosed. While exemplary embodiments of the inventive concepts disclosed have been described for this disclosure, it will be understood that numerous changes may be made which will readily suggest themselves to those skilled in the art and which are accomplished within the scope and coverage of the inventive concepts disclosed.

What is claimed is:

1. A signal light system, comprising:
    a measuring device for determining a velocity of a vehicle and generating a first signal indicative of the velocity of the vehicle;
    a control unit receiving the first signal from the measuring device, determining that the velocity of the vehicle is between a first threshold velocity and a second threshold velocity, or below the second threshold velocity, and for generating a second signal;
    a signal light positioned to project light behind a rear end of the vehicle; and
    a flasher module receiving the second signal from the control unit and enabling the signal light to provide a first warning responsive to the velocity of the vehicle being between the first threshold velocity and the second threshold velocity, and a second warning different from the first warning responsive to the velocity of the vehicle being below the second threshold velocity.

2. The signal light system of claim 1, wherein the signal light remains illuminated while the velocity of the vehicle is below the second threshold velocity or between the first threshold velocity and the second threshold velocity, independent of a deceleration by the vehicle.

3. The signal light system of claim 1, wherein the signal light remains illuminated while the velocity of the vehicle is below the second threshold velocity or between the first threshold velocity and the second threshold velocity, independent of an acceleration by the vehicle.

4. The signal light system of claim 1, further comprising a mode selector having an on-mode for enabling the control unit to generate the second signal and an off-mode for disabling the control unit from generating the second signal, the mode selector adapted to switch between the on-mode and the off-mode automatically based upon driving conditions.

5. The signal light system of claim 4, wherein the mode selector is also manually operated by a driver of the vehicle.

6. The signal light system of claim 4, further comprising a global positioning system (GPS) for determining a location having a posted speed limit equal to or below the first threshold velocity, wherein the GPS enables the mode selector in the off-mode when the GPS determines a location having a posted speed limit equal to or below the first threshold velocity.

7. The signal light system of claim 1, wherein the measuring device is a speedometer.

8. The signal light system of claim 1, wherein the measuring device is an inertial measurement unit.

9. The signal light system of claim 1, wherein the measuring device is a dead reckoning receiver.

10. The signal light system of claim 1, wherein the measuring device is an accelerometer.

11. The signal light system of claim 1, wherein the measuring device is a global positioning system.

12. The signal light system of claim 1, wherein the measuring device is an anti-lock brake system.

13. The signal light system of claim 1, wherein the control unit is configured to avoid adjustment of the first velocity threshold and the second velocity threshold by a driver of the vehicle.

14. The signal light system of claim 1, wherein the first warning provided by the signal light includes an alphanumeric message.

15. The signal light system of claim 14, wherein the alphanumeric message is "stop".

16. The signal light system of claim 1, wherein the second warning provided by the signal light includes an alphanumeric message.

17. The signal light system of claim 16, wherein the alphanumeric message is "slow".

18. The signal light system of claim 1, wherein the measuring device is not communicably coupled to the vehicle.

19. The signal light system of claim 1, further comprising a communication system receiving the second signal from the control unit and broadcasting a wireless communication signal, wherein the wireless communication signal is indicative of a first warning, a second warning, or the velocity, the first warning indicating the vehicle is traveling at any velocity below the first threshold velocity, the second warning indicating the vehicle is traveling at any velocity between the first threshold velocity and the second threshold velocity.

20. The signal light system of claim 19, wherein the wireless communication signal conforms to a set of protocols known as Vehicle-to-Vehicle communication.

21. The signal light assembly of claim 20, wherein the vehicle has a planned route, the measuring device is a global positioning system having a street and/or topography database and the first signal is further indicative of topography and grade along the planned route, and the control unit further monitors the topography along the planned route and determines an anticipated velocity change based, in part, on whether the grade or the topography might cause the vehicle to decrease velocity, and the flasher module further enabling the signal light to provide a third warning, wherein the signal light is activated to provide the third warning when the anticipated velocity change is at or above an anticipated velocity change threshold.

22. A signal light assembly, comprising:
a housing;
a measuring device, supported by the housing, the measuring device configured to determine a velocity of a vehicle and to generate a first signal indicative of the velocity of the vehicle;
a control unit configured to receive the first signal from the measuring device, and configured to generate a second signal based upon the velocity of the vehicle being between a first threshold velocity and a second threshold velocity, or below the second threshold velocity;
a signal light positioned to project light outside of the housing, the signal light being independent of the vehicle and not communicably connected to any warning light system of the vehicle; and
a flasher module, supported by the housing, configured to receive the second signal from the control unit and to activate the signal light to provide a first warning responsive to the velocity of vehicle being between the first threshold velocity and the second threshold velocity, and a second warning different from the first warning responsive to the velocity of the vehicle being below the second threshold velocity.

23. A signal light assembly, comprising:
a housing;
a measuring device, supported by the housing, the measuring device configured to determine a velocity of a vehicle and to generate a first signal indicative of the velocity of the vehicle;
a control unit configured to receive the first signal from the measuring device, and configured to generate a second signal based upon the velocity of the vehicle being below a threshold;
a signal light positioned to project light outside of the housing, the signal light being independent of the vehicle and not communicably connected to any warning light system of the vehicle; and
a flasher module, supported by the housing, configured to receive the second signal from the control unit and to activate the signal light to provide a warning; and
wherein the warning is a first warning, and wherein the vehicle has a planned route, the measuring device is a global positioning system having a street and/or topography database and the first signal is further indicative of topography and grade along the planned route, and the control unit further monitors the topography along the planned route and determines an anticipated velocity change based, in part, on whether the grade or the topography might cause the vehicle to decrease velocity, and the flasher module further enabling the signal light to provide a third warning, wherein the signal light is activated to provide a second warning when the anticipated velocity change is at or above an anticipated velocity change threshold.

* * * * *

UNITED STATES PATENT AND TRADEMARK OFFICE
CERTIFICATE OF CORRECTION

| | |
|---|---|
| PATENT NO. | : 11,104,270 B1 |
| APPLICATION NO. | : 16/433613 |
| DATED | : August 31, 2021 |
| INVENTOR(S) | : Rodney Timms |

It is certified that error appears in the above-identified patent and that said Letters Patent is hereby corrected as shown below:

In the Specification

Column 9, Line 11: Delete "Naystar" and replace with -- Navstar --

Column 9, Line 33: Delete "Naystar" and replace with -- Navstar --

Signed and Sealed this
Nineteenth Day of October, 2021

Drew Hirshfeld
*Performing the Functions and Duties of the*
*Under Secretary of Commerce for Intellectual Property and*
*Director of the United States Patent and Trademark Office*